US006992128B2

(12) United States Patent
Busch et al.

(10) Patent No.: US 6,992,128 B2
(45) Date of Patent: Jan. 31, 2006

(54) HIGHLY ACTIVE β-NUCLEATING ADDITIVE FOR POLYPROPYLENE

(75) Inventors: Detlef Busch, Saarlouis (DE); Petra Häde, Saarbrücken (DE); Bertram Schmitz, Sarreguemines (FR)

(73) Assignee: Treofan Germany GmbH & Co. KG, (DE)

( * ) Notice: Subject to any disclaimer, the term of this patent is extended or adjusted under 35 U.S.C. 154(b) by 0 days.

(21) Appl. No.: 10/511,913

(22) PCT Filed: May 12, 2003

(86) PCT No.: PCT/EP03/04931

§ 371 (c)(1),
(2), (4) Date: Oct. 20, 2004

(87) PCT Pub. No.: WO03/094832

PCT Pub. Date: Nov. 20, 2003

(65) Prior Publication Data
US 2005/0182175 A1 Aug. 18, 2005

(30) Foreign Application Priority Data
May 14, 2002 (DE) .................. 102 21 310

(51) Int. Cl.
*C08K 5/09* (2006.01)
*C08K 3/18* (2006.01)
*C08K 3/22* (2006.01)
*C08L 23/12* (2006.01)
*C08F 6/00* (2006.01)

(52) U.S. Cl. ............ 524/431; 524/785; 524/582; 524/583; 524/322; 524/584; 528/485; 528/502 B; 264/210.6; 264/210.7

(58) Field of Classification Search .......... 524/785, 524/431, 322, 582, 583, 584; 528/485, 502 B; 264/210.6, 210.7
See application file for complete search history.

(56) References Cited

U.S. PATENT DOCUMENTS

| 3,540,979 A | | 11/1970 | Hughes et al. | |
| 3,681,280 A | * | 8/1972 | Benito et al. | 523/333 |
| 3,997,494 A | | 12/1976 | Lever et al. | |
| 6,005,034 A | * | 12/1999 | Hayashida et al. | 524/117 |
| 6,235,823 B1 | * | 5/2001 | Ikeda et al. | 524/229 |

FOREIGN PATENT DOCUMENTS

| DE | 344359 | | 11/1921 |
| DE | 2 044 342 | | 3/1971 |
| DE | 2 332 583 | | 2/1974 |
| DE | 36 10 644 | | 10/1986 |
| DE | 44 20 989 | | 12/1995 |
| EP | 0 557 721 | | 9/1993 |
| JP | 62-283822 | * | 12/1987 |

* cited by examiner

*Primary Examiner*—Fred Teskin
*Assistant Examiner*—Ives Wu
(74) *Attorney, Agent, or Firm*—Connolly Bove Lodge & Hutz

(57) ABSTRACT

The invention relates to a method for enhancing the fraction of β-crystal modification in polypropylene by compounding nanocrystalline substances. A β-fraction of 50–100% is achieved with said method. The compounds are characterized by improved mechanical properties. The nanocrystalline powders can be directly compounded and compatibilized with surface-active substances in the PP matrix for better dispersion.

20 Claims, No Drawings

HIGHLY ACTIVE β-NUCLEATING ADDITIVE FOR POLYPROPYLENE

RELATED APPLICATIONS

This application is a national stage application (under 35 U.S.C. 371) of PCT/EP03/04931 filed May 12, 2003 which claims benefit to German Application Serial No. 102 21 310.0 filed May 14, 2002.

The invention relates to a process for increasing the content of the β-crystal modification in polypropylene.

Besides the amorphous phase, three different crystalline phases, the α-, β- and γ-phases, of polypropylene are known. On cooling of polypropylene melts, the α-crystalline PP usually forms predominantly. By means of a certain temperature programme during cooling of a polypropylene melt, an increased content of β-crystalline phase can be produced. The content of β-crystalline PP produced in this way is less than 10%. The hexagonal β-modification of PP is distinguished, compared with the monoclinic α-modification, by better mechanical properties, in particular increased impact strength and stress cracking resistance. In addition, the β-modification of polypropylene has a significantly lower melting point of 148–150° C. compared with the α-modification, having a melting point of 160° C. An increased content of β-crystalline PP therefore has a favourable effect on certain service properties of the polypropylene in some applications. For this reason, some additives have been developed in the past which result in even higher contents of polypropylene in the β-modification and are therefore generally known as β-nucleators or β-nucleating agents.

The dye dihydroquinacridine is patented in Germany Patent 344359 owing to its β-nucleating action. However, the disadvantage of this nucleating agent is the intense red coloration and the poor thermal stability, which frequently results in decomposition of the nucleating agent and thus loss of its activity during compounding. U.S. Pat. No. 3,540,979 describes the calcium salt of phthalic acid as thermally stable nucleating agent. The disadvantage of this nucleating agent is the low activity. The content of β-crystalline PP achieved therewith is at most 70% (K-0.5–0.7).

A two-component nucleation system comprising calcium carbonate and organic dicarboxylic acids is described in DE 3610644. However, this nucleation system exhibits varying activity in practice. It therefore lacks reproducibility. Direct use of the calcium salts of the dicarboxylic acids described in DE 3610644 is described in Patent DE 4420989. The β-nucleating action of various dicarboxamides, in particular N,N-dicyclohexyl-2,6-naphthalenedicarboxamide, is described in EP-0557721. The disadvantage of this nucleator are the high starting-material costs and complicated synthetic steps in preparation.

The object of the present invention was to provide a process for the production of β-crystalline polypropylene. By means of this process, it should be possible to achieve high β-contents reproducibly and reliably. The process should be simple and efficient to carry out. The modification with a β-nucleating agent must not impair the usual important service properties of the polypropylene.

This object is achieved by a process for the preparation of a polypropylene mixture having an increased content of β-crystalline polypropylene, in which a polypropylene mixture of nanoscale iron oxide and polypropylene is melted at a temperature of at least 150° C. and subsequently cooled in such a way that the cooled polypropylene melt has an increased content of β-crystalline polypropylene.

The present invention is based on the discovery that nanoscale iron oxides result in the formation of a high content of β-crystalline polypropylene on cooling of a PP melt comprising these iron oxides. The cooled melt having a high β-content forms a transparent PP matrix since the particle size of the nanoscale iron oxides is significantly smaller than the wavelength of visible light. Nanoscale iron oxides generally have a mean particle size of from 1 to 50 nm.

It has been found that particularly suitable β-nucleating iron oxides are iron(II) and iron(III) oxides as well as mixed iron(II) and iron(III) oxides, for example $Fe_2O_3$ or $Fe_3O_4$. Of these, particularly suitable iron oxides are those having cubic closest packing in which the $O^{2-}$ ions form a cubic lattice in which the $Fe^{3+}$ ions are randomly distributed in the vacant octahedral and tetrahedral lattice positions ($Fe_2O_3$) or, in the case of mixed oxides ($Fe_3O_4$), the $Fe^{2+}$ occupy the vacant octahedral lattice positions and $Fe^{3+}$ occupy the vacant tetrahedral lattice positions. In particular, nanoscale magnetite and nanoscale maghemite have proven to be particularly effective β-nucleating agents in polypropylene.

For better dispersibility of the nanoscale iron oxides in the PP matrix, the iron oxide powders can be hydrophobicized by the addition of surface-active substances, such as, for example, with polyfunctional carboxylic acids, silanes, amines or sulphonates. Processes of this type are known per se from the prior art, for example are described in Macromol. Mater. Eng. 275, 8–17 (2000) and GAK 5/1988 Volume 41, page 211 ff. or Macromol. Rapid Commun, 2001, 22, 176–180. Particularly preferred coatings of the nanoscale iron oxides consist of long-chain fatty acids, such as oleic acid or stearic acid.

The synthesis of the nanocrystalline iron oxides can be carried out via conventional processes known per se, such as, for example, the sol-gel process, flame pyrolysis, EDOC or precipitation reactions. These processes enable the preparation of nanoscale iron oxides having a particle size in the range from 1 to 50 nm, preferably from 5 to 30 nm, in particular from 10 to 20 nm. Precipitation from sols containing $Fe^{2+}$ and/or $Fe^{3+}$ ions by addition of lye is particularly suitable (Nouveau Journal de Chimie, Vol. 7, No. 5-1983, p. 325). The nanocrystalline iron oxides may, if desired, be subjected to a hydrothermal aftertreatment step in order to increase the crystallinity by holding the freshly precipitated nanoscale iron oxides at increased pressure and elevated temperature for a certain time.

The nanoscale iron oxides described above are incorporated into the polypropylene matrix using conventional methods. To this end, for example, mechanical premixes of propylene granules and the nanoscale iron powder are prepared and subsequently compounded in a twin-screw extruder. In order to avoid agglomeration of the nanoscale particles, it is advantageous to apply one of the coatings described above for hydrophobicization of the iron oxides before the compounding. Processes of this type for the compounding of nanoscale additives are described, for example, in Macromol. Rapid Commun, 2001, 22, 176–180. These processes are also suitable for the preparation of compounds for the present invention.

The mixture of polypropylene and nanoscale iron oxide generally comprises at least 85% by weight, preferably from 90 to <100% by weight, in particular from 98 to <100% by weight, of a polypropylene. In general, the propylene polymer comprises at least 90% by weight, preferably from 94 to 100% by weight, in particular from 98 to 100% by weight, of propylene. The corresponding comonomer content of at most 10% by weight or from 0 to 6% by weight or from 0 to 2% by weight respectively generally consists, if present, of ethylene and/or butylene. The data in % by weight in each case relate to the propylene polymer. Suitable copolymers containing ethylene and/or butylene as comonomer are random copolymers or block copolymers.

Preference is given to isotactic propylene homopolymers having a melting point of from 140 to 170° C., preferably from 155 to 165° C., and a melt flow index (measurement DIN 53 735 at a load of 21.6 N and 230° C.) of from 1.0 to 50 g/10 min, preferably from 1.5 to 20 g/10 min. The n-heptane-soluble content of the polymer is generally from 1 to 10% by weight, preferably 2–5% by weight, based on the starting polymer. The molecular weight distribution of the propylene polymer can vary.

The ratio of weight average $M_w$ to number average $M_n$ is generally between 1 and 15, preferably from 2 to 10, very particularly preferably from 2 to 6. Such a narrow molecular weight distribution of the propylene homopolymer is achieved, for example, by peroxidic degradation thereof or by the preparation of the polypropylene by means of suitable metallocene catalysts.

In a further embodiment of the invention, the polypropylene employed in the base layer is highly isotactic. For highly isotactic polypropylenes of this type, the chain isotacticity index, determined by $^{13}C$-NMR spectroscopy, of the n-heptane-insoluble content of the polypropylene is at least 95%, preferably from 96 to 99%.

In the process according to the invention for the preparation of polypropylene having an increased content of β-crystalline polypropylene, a mixture of polypropylene and nanoscale iron oxide is firstly melted at suitable temperatures. This temperature is generally in the range from 150 to 165° C. The melting is preferably carried out in a suitable extruder, for example in a twin-screw extruder, which simultaneously ensures good mixing of the nanoscale iron oxide in the polypropylene. The molten mixture is extruded and cooled at suitable temperatures. In other process variants, the mixture or compound is prepared as described above in a prior working step. These compounds are subsequently employed in the process according to the invention together with pure polypropylene. The compounds can be melted and mixed with polypropylene in any desired extrusion die or in a compounder. It is essential to the invention that the cooling of the iron oxide-containing melt after extrusion takes place in such a way that the β-nucleating action of the nanoscale iron oxides takes effect. For this purpose, it is preferred to cool the melt slowly at a temperature in the range from 60 to 130° C., preferably from 80 to 125° C. The closer this temperature to the vicinity of the crystallization temperature of the β-crystalline polypropylene (about 139° C.), the more favourable the conditions for the formation of the β-crystalline modification. In this way, a varying content of β-polypropylene can be produced via the choice of temperature during cooling. In addition, the residence time of the cooling melt at the respective temperature has an effect on the β-content achieved. In order to achieve the greatest possible β-content, the melt should be cooled slowly at elevated temperatures (120–130° C.), with the requisite residence time at a given temperature depending in the individual case on the shaping during extrusion.

Depending on the application, lower β-contents in the polypropylene may also be sufficient. In these cases, the β-nucleating iron oxides have a positive effect since the cooling rate can be increased, i.e. faster take-off rates can be employed.

By means of the process according to the invention, it is possible to achieve a β-PP content of >90% (DSC method) under corresponding cooling conditions. For example, a content of β-crystalline polypropylene of 92% was determined via DSC measurements (method described below) on isotactic polypropylene comprising 1 % by weight of nanoscale iron oxide.

The process according to the invention can advantageously be used in the production of films, mouldings, in particular pipes and tubes, fibres and other extrusions. The increased β-content in the polypropylene has a favourable effect in a very wide variety of extrusion applications, for example since the extrusion temperatures can be reduced. For some applications, an increased content of β-crystalline polypropylene is advantageous since service properties of the polypropylene are thereby improved, for example a higher notched impact strength and stress cracking resistance of the polypropylene are achieved. In a further application, the high β-content in the polypropylene is utilized for the production of porous films by conversion of the β-modification into the alpha-modification during stretching of the films or for the production of rough surfaces of a stretched film.

In a process of this type for the production of a film, nanoscale iron oxide and polypropylene are mixed and melted in an extruder at a temperature of at least 150° C. The melt is extruded through a flat-film die and cooled and solidified to give a pre-film in such a way that the desired content of β-crystalline polypropylene is formed in the pre-film. For the production of a microporous film, a content of at least 40%, preferably from 60 to 80%, of β-polypropylene (measured by DSC) in the pre-film is generally aimed at, whereas lower contents of, for example, from 10 to 40% may be sufficient for the production of surface roughness. The pre-film is subsequently warmed in a manner known per se and stretched in the longitudinal direction, preferably at a temperature of less than 140° C., preferably from 90 to 125° C., and with a stretching factor of from 3:1 to 5:1. After the longitudinal stretching, the longitudinally stretched film is re-warmed and stretched in the transverse direction, preferably at a temperature of greater than 140° C. from 145 to 160° C. and with a stretching ratio of from 3:1 to 6:1. Due to the selected temperature during stretching, the β-crystalline polypropylene of the pre-film is converted into the alpha modification of polypropylene, and, depending on the process conditions, a continuous porous network structure in the film or at least a surface roughness due to pit-like depressions which form during the conversion processes is produced.

In order to determine the β-crystalline content in polypropylene which can be achieved by means of the process according to the invention, two methods can be employed. Firstly, the β-content can be determined by means of DSC and secondly via wide angle X-ray scattering.

Characterization by means of DSC is described in J. o. Appl. Polymer Science, Vol. 74, p.: 2357–2368, 1999 by Varga and is carried out as follows: the sample to which the β-nucleator has been added is firstly heated to 220° C. in the DSC at a heating rate of 20° C./min and melted(1st heating). It is then cooled to 100° C. at a cooling rate of 10° C./min, before being re-melted at a heating rate of 10° C./min (2nd heating). During the 2nd heating, the degree of crystallinity $K_{\beta,DSC}$ is determined from the ratio of the enthalpies of melting of the β-crystalline phase ($H_\beta$) to the sum of the enthalpies of melting of β- and α-crystalline phase ($H_\beta+H_\alpha$).

$$K_{\beta,DSC}=(H_\beta)/(H_\beta+H_\alpha)$$

In the second method, the degree of crystallinity is described from the wide angle X-ray diagram through the Turner-Jones equation (Makromolekulare Chem. 75 (1964) 134):

$$K_{\beta,X\text{-}ray}=[k_{\beta1}]/[k_{\beta1}]/[k_{\beta1}+(k_{\alpha1}+k_{\alpha2}+k_{\alpha3})]$$

$K_{\beta,X\text{-}ray}$ here is the β-content, $k_{\beta1}$ is the height of the peak of the β-phase, and $k_{\alpha1}$, $k_{\alpha2}$ and $k_{\alpha3}$ are the height of the three peaks of the α-phase. Since β-crystalline PP is thermodynamically metastable and is converted into the thermodynamically stable α-phase at elevated temperatures, a higher β-content is always found by means of wide angle X-ray scattering than by means of the DSC method.

EXAMPLE 1

A nanocrystalline iron oxide (Fe3O4) was compounded into an isotactic polypropylene at a temperature of 200° C. in a ZSK 30 twin-screw extruder. The polypropylene was an isotactic homopolymer having a melting point of 162° C. and an MFI of . . . (Exxon Escorene PP 4352 F1). The nanocrystalline iron oxide had a mean particle size of 13 nm. This was magnetite having a characteristic black colour. An amount of 3% by weight of iron oxide was incorporated into the polypropylene.

EXAMPLE 2

A nanocomposite was produced as described in Example 1. In contrast to Example 1, the nanoscale iron oxide was surface-modified with stearic acid before the compounding, and the concentration of magnetite was reduced from 3 to 1% by weight.

EXAMPLE 3

A nanocomposite was produced as described in Example 2. In contrast to Example 2, the nanoscale iron oxide was subjected to hydrothermal aftertreatment before the surface modification with stearic acid, and the concentration was increased from 1 to 2% by weight.

The respective β-content of the nanocomposite according to Examples 1 to 3 was determined as described by DSC from the 2nd heating curve.

| Example No. | n-particles | Conc. [% by wt.] | β-content [%] |
|---|---|---|---|
| 1 | n-Fe$_3$O$_4$ | 3 | ~70 |
| 2 | n-Fe$_3$O$_4$, surface modifier stearic acid | 1 | ~90 |
| 3 | n-Fe$_3$O$_4$, hydrothermally aftertreated, surface modifier stearic acid | 2 | ~70 |

The invention claimed is:

1. Process for the preparation of polypropylene having an increased content of β-crystalline polypropylene, which comprises mixing nanoscale iron oxide and polypropylene to form a mixture and melting the mixture at a temperature of at least 150° C. and subsequently cooling in such a way that the cooled polypropylene melt has an increased content of β-crystalline polypropylene.

2. Process according to claim 1, characterized in that a content of β-crystalline polypropylene of greater than 50%, is produced on cooling of the polypropylene melt.

3. Process according to claim 1, characterized in that the cooling of the polypropylene melt is carried out at a temperature in the range 100–140°C.

4. Process according to claim 1, characterized in that the mixture of polypropylene and iron oxide is melted in an extruder at a temperature of from 150 to 170° C.

5. Process according to claim 1, characterized in that the polypropylene of the mixture is an isotactic polypropylene having a melting point in the range from 140 to 170° C.

6. Process according to claim 1, characterized in that the polypropylene is a copolymer having a comonomer content of ethylene and/or butylene of up to 10% by weight.

7. Process according to claim 1, characterized in that the polypropylene is a mixture of propylene homopolymer and propylene copolymer.

8. Process according to claim 1, characterized in that the nanoscale iron oxide has a mean particle size of less than 50 nm.

9. Process according to claim 1, characterized in that the iron oxide comprises Fe(II) or Fe(III) oxide.

10. Process according to claim 1, characterized in that the iron oxide has cubic closest packing of the $O^{2-}$ ions.

11. Process according to claim 1, characterized in that the iron oxide is Fe$_3$O$_4$ or Fe$_2$O$_3$.

12. Process according to claim 1, characterized in that the iron oxide is magnetite or maghemite.

13. Process according to claim 1, characterized in that the iron oxide has been provided with a surface coating.

14. Process according to claim 12, characterized in that the surface coating consists of long-chain fatty acids, silanes, amines or sulphonates.

15. Process according to claim 13, characterized in that a mixture of polypropylene and nanoscale iron oxide is prepared, and this mixture is melted and cooled.

16. Process according to claim 14, characterized in that a compound of polypropylene and nanoscale iron oxide is prepared, and this compound is mixed with polypropylene, melted and cooled.

17. Process for the production of a biaxially stretched flat film, which comprises mixing nanoscale iron oxide and polypropylene to form a mixture and melting the mixture in an extruder at a temperature of at least 150° C. to form a melt, and extruding the melt through a flat-film die, and cooling the melt to give a pre-film in such a way that a content of at least 50% (measured by DSC) of β-crystalline polypropylene is formed, and warming the pre-film and stretching the pre-film in the longitudinal direction and cooling, subsequently re-warming and stretching in the transverse direction, and where the temperature during longitudinal stretching is selected in such a way that the β-crystalline polypropylene of the pre-film is converted into the alpha modification of polypropylene.

18. Process according to claim 17, characterized in that the biaxially oriented film is opaque and porous.

19. Process according to claim 1, characterized in that a content of β-crystalline polypropylene from 70 to <100%, is produced on cooling of the polypropylene melt and the nanoscale iron oxide has a mean particle size from 1 to 30 nm.

20. Process according to claim 13, wherein the surface coating consists of oleic acid, stearic acid, silane, amine or sulphonate.

* * * * *